US012535785B2

(12) United States Patent
Singh et al.

(10) Patent No.: US 12,535,785 B2
(45) Date of Patent: Jan. 27, 2026

(54) PREDICTIVE MODELS AND MULTI-OBJECTIVE CONSTRAINT OPTIMIZATION ALGORITHM TO OPTIMIZE DRILLING PARAMETERS OF A WELLBORE

(71) Applicants: Gulshan Singh, Lower Saxony (DE); Franck Kpetehoto, Spring, TX (US); Christian Herbig, Lower Saxony (DE); Thorsten Krueger, Lower Saxony (DE); John Macpherson, Lower Saxony (DE)

(72) Inventors: Gulshan Singh, Lower Saxony (DE); Franck Kpetehoto, Spring, TX (US); Christian Herbig, Lower Saxony (DE); Thorsten Krueger, Lower Saxony (DE); John Macpherson, Lower Saxony (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 1006 days.

(21) Appl. No.: 17/519,301

(22) Filed: Nov. 4, 2021

(65) Prior Publication Data

US 2022/0137568 A1    May 5, 2022

Related U.S. Application Data

(60) Provisional application No. 63/110,196, filed on Nov. 5, 2020.

(51) Int. Cl.
G05B 13/04    (2006.01)
E21B 21/08    (2006.01)
(Continued)

(52) U.S. Cl.
CPC ............ *G05B 13/048* (2013.01); *E21B 21/08* (2013.01); *E21B 44/00* (2013.01); *E21B 44/04* (2013.01);
(Continued)

(58) Field of Classification Search
CPC ....... G05B 13/048; E21B 21/08; E21B 44/00; E21B 44/04; E21B 44/06; E21B 45/00; E21B 2200/20; E21B 49/00
See application file for complete search history.

(56) References Cited

U.S. PATENT DOCUMENTS 9,085,958 B2    7/2015    Laing et al.
9,262,713 B2    2/2016    Shelley et al.
(Continued)

FOREIGN PATENT DOCUMENTS

CN    110348046 A    10/2019
WO    2019051435 A1    3/2019

OTHER PUBLICATIONS

Vahid Mansouri, Rassoul Khosravanian, David A. Wood, Bernt S. Aadnoy, "3-D well path design using a multi objective genetic algorithm", Journal of Natural Gas Science and Engineering, Available online Aug. 31, 2015 (Year: 2015).*

(Continued)

*Primary Examiner* — Rehana Perveen
*Assistant Examiner* — Angel Calle
(74) *Attorney, Agent, or Firm* — CANTOR COLBURN LLP

(57) ABSTRACT

A computer-readable medium performs a method for performing a drilling operation in a formation. A plurality of predictive models are determined. Each predictive model of the plurality of predictive models is determined for an interval in the downhole formation, wherein each predictive model of the plurality of predictive models relates one or
(Continued)

more drilling parameters of the drilling operation to a plurality of objectives for the drilling operation. A plurality of target objectives is defined. A plurality of outcomes is determined for each of the predictive models of the plurality of predictive models and the plurality of target objectives. An optimization is performed to select an outcome from the plurality of outcomes. The drilling operation is performed using the selected outcome to achieve the plurality of target objectives.

20 Claims, 11 Drawing Sheets

(51) Int. Cl.
  E21B 44/00 (2006.01)
  E21B 44/04 (2006.01)
  E21B 44/06 (2006.01)
  E21B 45/00 (2006.01)
  E21B 49/00 (2006.01)
(52) U.S. Cl.
  CPC .............. *E21B 44/06* (2013.01); *E21B 45/00* (2013.01); *E21B 49/00* (2013.01); *E21B 2200/20* (2020.05)

(56) References Cited

U.S. PATENT DOCUMENTS

| | | | |
|---|---|---|---|
| 9,410,546 | B2 | 8/2016 | Jaeger et al. |
| 9,784,099 | B2 | 10/2017 | Kale et al. |
| 9,828,845 | B2 | 11/2017 | Kpetehoto et al. |
| 9,938,816 | B2 | 4/2018 | Astrid et al. |
| 10,317,875 | B2 | 6/2019 | Pandurangan et al. |
| 2011/0172976 | A1* | 7/2011 | Budiman ................. E21B 47/04 703/2 |
| 2012/0285701 | A1* | 11/2012 | Cheng ..................... E21B 43/30 166/369 |
| 2014/0326449 | A1* | 11/2014 | Samuel .................. E21B 41/00 340/853.3 |
| 2015/0160369 | A1 | 6/2015 | Awotunde et al. |
| 2015/0330209 | A1 | 11/2015 | Panchal et al. |
| 2015/0356450 | A1* | 12/2015 | Dursun ................... E21B 41/00 706/12 |
| 2016/0208794 | A1 | 7/2016 | Singh et al. |
| 2018/0051552 | A1* | 2/2018 | Li .......................... E21B 47/024 |
| 2019/0234207 | A1 | 8/2019 | Subramaniyan et al. |
| 2019/0316457 | A1 | 10/2019 | Al-Rubaii et al. |
| 2021/0058235 | A1* | 2/2021 | Rangarajan ........... H04L 9/0643 |
| 2021/0108500 | A1* | 4/2021 | Venugopal .............. E21B 41/00 |
| 2021/0404313 | A1* | 12/2021 | Saidutta ................... E21B 7/04 |
| 2022/0316278 | A1* | 10/2022 | Pandya ................... E21B 44/02 |

OTHER PUBLICATIONS

Xiao-Yu Zhong, Jia-Peng Liu, Kai-Dong Chen, Jia-Qui Chen, Ning-Yu Wang, Chun-Wang He, Qiu-Hai Lu, Zai-Bin Cheng, Wen-Jun Huang, "A time-optimal wellbore trajectory design for slide drilling systems", Springer-Verlag GmbH Germany, Part of Springer Nature 2020, Published online: Sep. 27, 2020. (Year: 2020).*

Turgay Ertekin, NPL, "Artificial Intelligence Applications in Reservoir Engineering: A Status Check", Published Jul. 27, 2019 (Year: 2019).*

"Method and System for Multi-objective Optimization in Reservoir Simulation History-matching (Multiobjective Evolutionary Strategy Approach History Matching and Production Optimization)"; IP.com Disclosure No. PCOM000209734D; Aug. 11, 2011; 2 Pages.

Gan et al.; "To Improve Drilling Efficiency by Multi-objective Optimization of Operational Drilling Parameters in the Complex Geological Drilling Process"; Proceedings of the 37th Chinese Control Conference; Jul. 25-27, 2018; pp. 10238-10243.

International Search Report and Written Opinion Issued in International Application No. PCT/US2021/057855 mailed Feb. 23, 2022; 7 Pages.

Kim et al.; "Multi-objective History Matching with a Proxy Model for the Characterization of Production Performances at the Shale Gas Reservoir"; Energies; vol. 10; 2017; 16 Pages.

Zheng et al.; "Multi-objective Cellular Particle Swarm Optimization for Wellbore Trajectory Design"; Applied Soft Computing; Jan. 16, 2019; vol. 77; pp. 106-117.

Zheng et al.; Multi-objective Cellular Particle Swarm Optimization and RBF for Drilling Parameters Optimization; Mathematical Biosciences and Engineering; vol. 16, No. 3; Published Feb. 19, 2019; pp. 1258-1279.

* cited by examiner

PREDICTIVE MODELS AND MULTI-OBJECTIVE CONSTRAINT OPTIMIZATION ALGORITHM TO OPTIMIZE DRILLING PARAMETERS OF A WELLBORE

CROSS REFERENCE TO RELATED APPLICATIONS

This application claims priority to U.S. Provisional Application Ser. No. 63/110,196, filed on Nov. 5, 2020, the contents of which are incorporated by reference herein in their entirety.

BACKGROUND

In the resource recovery industry, a drill string is operated to drill a well in a downhole formation to recover hydrocarbons from the downhole formation. A drilling rig operator generally has multiple objectives or goals when drilling the well. However, these multiple objectives can conflict with each other, making it difficult to determine an optimal method by which to drill the well. In other words, it is difficult to know what configuration of the drilling parameters will best achieve the multiple objectives of the drilling rig operator. Therefore, there is a need to be able to determine a set of drilling parameters that can optimize a drilling operation for multiple objectives.

SUMMARY

In one aspect, a method of performing a drilling operation in a downhole formation is disclosed. A plurality of predictive models is determined, each predictive model of the plurality of predictive models being determined for an interval in the downhole formation, wherein each predictive model of the plurality of predictive models relates one or more drilling parameters of the drilling operation to a plurality of objectives for the drilling operation. A plurality of target objectives is defined. A plurality of outcomes is determined for each of the predictive models of the plurality of predictive models and the plurality of target objectives. An optimization is performed to select an outcome from the plurality of outcomes. The drilling operation is performed using the selected outcome to achieve the plurality of target objectives In another aspect, a computer-readable medium having a set of instructions thereon that when accessed by a processor, enable the processor to execute a method of performing a drilling operation in a formation is disclosed. The method includes determining a plurality of predictive models, each predictive model of the plurality of predictive models being determined for an interval in the formation, wherein each predictive model of the plurality of predictive models relates one or more drilling parameters of the drilling operation to a plurality of objectives for the drilling operation, defining a plurality of target objectives, determining a plurality of outcomes for each of the predictive models of the plurality of predictive models and the plurality of target objectives, performing an optimization to select an outcome from the plurality of outcomes, and performing the drilling operation using the selected outcome to achieve the plurality of target objectives

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
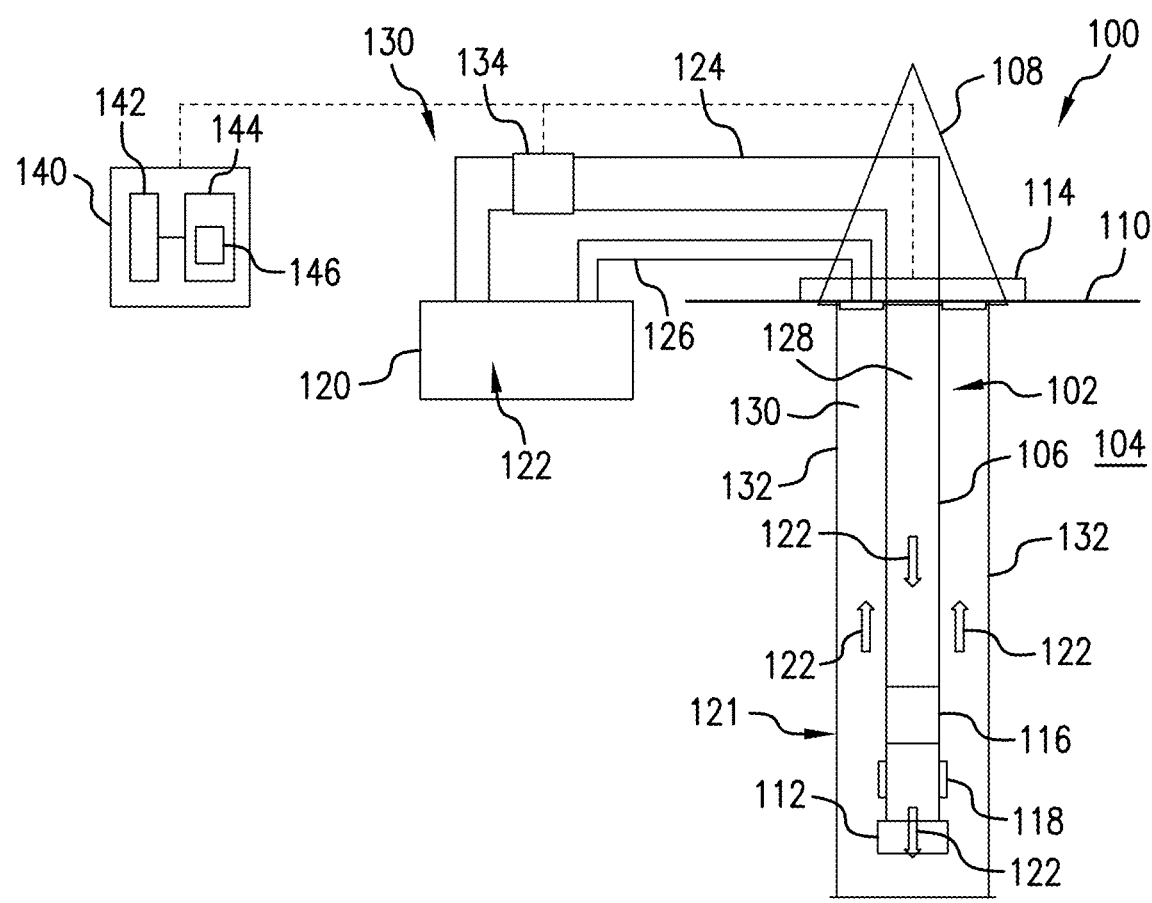
FIG. 1 shows a drilling assembly for drilling a well in a formation, in an embodiment.

Referring to FIG. 1, a drilling assembly 100 is shown for drilling a well 102 in a formation 104, in an embodiment. The well 102 is also referred to as a wellbore. The drilling assembly 100 includes a drill string 106 extending into the well 102 from a rig 108 at a surface location 110. The drill string 106 includes a bottom hole assembly (BHA) 121 and a drill bit 112 at a bottom end of the drill string for drilling the well 102 and extending a length of the well 102. A rotary table 114 at the rig 108 can be used to rotate the drill string 106 and thereby rotate the drill bit 112. Alternatively, a downhole motor 116 can be used to rotate the drill bit 112 with respect to the drill string 106. The rig 108 can be used to control weight or force applied along an axis of the drill string 106 at the surface location 110. A steering device or steering assembly 118 can be used to change a direction of drilling of the drill string 106, thereby allowing for the drilling of a deviated and/or horizontal well. The steering device may include a steering unit, such as a rotary steerable system (RSS) or a motor including an adjustable kick-off (AKO).

The drilling assembly 100 further includes a mud pit 120 for storage of drilling mud 122 used in drilling of the well 102. A standpipe 124 extends from the mud pit 120 to an opening at a top end of the drill string 106, and a return line 126 extends from a top end of the well 102 to the mud pit 120. Drilling mud 122 is circulated from the mud pit 120 to an inner bore 128 of the drill string 106 via the standpipe 124. The drilling mud 122 flows down the inner bore 128 to exit the drill string 106 at the drill bit 112 and then flows back to the surface via the annular space 130 between the drill string and a wall 132 of the well 102. The drilling mud 122 then flows back to the mud pit 120 via the return line

126. The drilling mud 122 can be used to rotate elements of the downhole motor 116 as it passes through the inner bore 128. Also, the drilling mud 122 flowing through the annular space 130 draws cuttings (not shown) formed by rotation of the drill bit 112 to the surface and out of the well 102. A pump 134 can be used to control a flow rate of the drilling mud 122.

A control unit 140 can be used to control operation of the drilling assembly 100. The control unit 140 includes a processor 142 and a memory storage device 144 having programs and/or instructions stored therein that, when accessed by the processor 142, enable the processor 142 to perform various operations disclosed herein. In one embodiment, the processor 142 obtains measurements from the drilling assembly 100, processes the measurements to determine various drilling parameters for the drilling assembly 100 and operates various devices of the drilling assembly 100 according to the determined drilling parameters. For example, the processor 142 can be used to control operation of the rig 108, rotary table 114 and pump 134 as well as other devices of the drilling assembly 100. The programs and/or instructions can be used at the processor 142 to determine values of the drilling parameters to use in order to achieve various objectives for a drilling operation and to drill the wellbore 102, using the methods disclosed herein. An objective for the drilling operation can include achieving a certain value for a parameter that relates to the quality of the borehole (e.g., dog leg severity, tortuosity, borehole spiraling, deviation from the target well path), achieving a certain value for a parameter that relates to the wear of the drilling assembly (e.g., vibration (axial, lateral, torsional, stick-slip), bending, torsion, temperature) and achieving a certain value for a parameter that relates to the quality of formation evaluation data that are recorded while drilling the well (e.g., borehole diameter, borehole spiraling, vibration (axial, lateral, torsional, stick-slip), rate of penetration (ROP), revolutions per minute (RPM)).

The bottom hole assembly 121 includes various sensors (not shown), many of which are conveyed downhole by the drill string 106. The various sensors can be used to measure drilling parameters related to the drilling operation, such as revolutions per minute (RPM) of the drill string 106 and/or the drill bit 112, flow rate of the drilling mud 122, a weight-on-bit (WOB), a torque on the drill string 106 (surface and/or downhole) and/or the drill bit 112, mud density, mud viscosity, mud sand content, motor speed, rate of penetration (ROP) etc. In general, the control unit 140 controls these drilling parameters to operate the drill string 106. The sensors can also be used in deriving various parameters related to an objective of the drilling rig operator. Illustrative parameters can include, but are not limited to, a rate of penetration (ROP) of the drill string 106, a measure of the amount of power used to drill (such as rotational or axial power), a measure of the specific energy used to drill (such as mechanical specific energy (MSE)), a measure of axial, lateral, or torsional vibration of the drill string, a measure of drill string and/or BHA bending, a torque acting on the drill string, a hole cleaning efficiency, a wellbore integrity (e.g., gas or oil content in the mud, fluid loss), a wear rate of the drill bit, a number of downlinks, a connection time, a number of trips, drill time, temperature in the BHA, and a measure of the quality of the borehole (e.g., tortuosity, local dog legs, borehole spiraling). The measure of vibration may include high-frequency torsional oscillation (HFTO) and stick-slip torsional oscillation. High-frequency torsional oscillations has a frequency that is typically above 50 Hz, while stick-slip torsional oscillations typically has a frequency below 1 Hz. The quality of the borehole may be measured by many means, such as a borehole caliper, a measure of the deviation of the wellbore from the planned path (based on magnetometer and accelerometer data (survey data)), and the ability to complete the wellbore for production of hydrocarbons without remedial operations to condition the wellbore. In one embodiment, the sensors are configured to measure parameters related to drill string component bending, rotation and vibrational oscillation. The sensors may for example include dynamic sensors (e.g., accelerometers, magnetometers, inertia sensors, etc.), torque sensors, and/or bending sensors may be installed at or near the drill bit 112 and/or the BHA 121. The sensors can be located at desired locations along the drill string 106. The sensors that provide data for dynamic parameters of the BHA are called dynamic sensors.

The drilling assembly can also contain other sensors for providing a variety of measurements relating to the downhole formation surrounding the wellbore and for drilling the wellbore along a desired well path (such as by geosteering). Such sensors may include a sensor for measuring the formation resistivity near and/or in front of the drill bit, a gamma ray sensor for measuring the formation gamma ray intensity, a nuclear sensor for measuring the density of the formation, a nuclear magnetic resonance sensor for measuring formation porosity and permeability, a sampling sensor for taking samples of a formation fluid downhole, a pressure sensor for measuring a pressure in the wellbore, an acoustic sensor for measuring travel times of acoustic waves in the formation, a temperature sensor for measuring a temperature in the wellbore and sensors for determining the inclination, azimuth and position of the drill string. The sensors that provide data for formation parameters are called formation evaluation sensors (FE sensors). The determined data for formation parameters can be used to identify a type of formation or a specific lithology. The sensors that provide data for directional parameters are called measurement-while-drilling sensors (MWD sensors). Measurement-while-drilling sensors may include the dynamic sensors.

Figure 2:
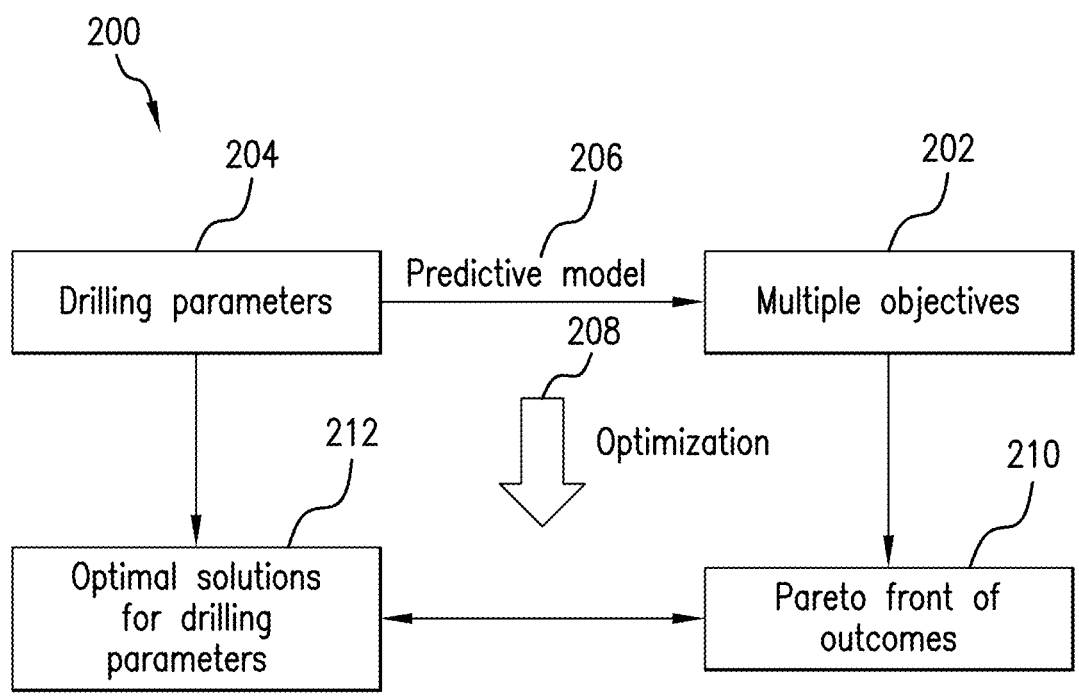
FIG. 2 shows a schematic diagram illustrating a method of optimizing a drilling operation of the drilling assembly, in an embodiment.

FIG. 2 shows a schematic diagram 200 illustrating a method of optimizing a drilling operation of the drilling assembly 100, in an embodiment. The method includes obtaining a set of objectives 202, also referred to as a plurality of objectives, multiple objectives, or multi-objectives for the drilling operation. These objectives can be in conflict with each other. An example of conflicting objectives can be rate of penetration (ROP) and level of vibration (e.g., axial, lateral, torsional) as a measure for a vibration damage, or rate of penetration (ROP) and mechanical specific energy (MSE). Generally, a drilling rig operator desires both a high rate of penetration and a low level of vibration, or a high rate of penetration and a low mechanical specific energy. However, a high rate of penetration tends to result in a high level of vibration, and a high rate of penetration tends to result in a high mechanical specific energy.

The method also includes obtaining a set of drilling parameters 204, also referred to as a plurality of drilling parameters, for the drill string and creating a mathematical relation between the set of drilling parameters 204 and the set of objectives. At least one predictive model 206 is thus built and validated to form a mathematical relation or association between the set of drilling parameters and the set of objectives. The at least one predictive model 206 can be based on historical data such as data from nearby wells previously drilled in the downhole formation, data from a computer simulation, or a combination thereof. Historical data includes values of drilling parameters used when drilling the nearby (offset) wells in the formation and the objectives achieved by the drilling. For example, a selected value of weight on bit and/or RPM can be found to result in a selected rate of penetration (ROP) or drill time at a nearby well. Historical data can be corrected for true vertical depth (TVD) or well position or measured depth (MD), so that drilling parameters and objectives can be compared by depth. The historical data can be divided or segmented into a plurality of portions of historical data that belong to a plurality of depth intervals and a predictive model can be determined for each of the depth intervals. Each depth interval has a start depth and an end depth. In an alternative embodiment historical data can be divided or segmented into a plurality of portions of historical data that belong to a plurality of formation types and a predictive model can be determined for each of the formation types. Each formation type has associated a formation depth interval including a formation start depth and a formation end depth. Based on the plurality of depth intervals or the plurality of formation types a plurality of predictive models is determined, also referred to as a set of predictive models. The model may comprise or may be built by one or more equations or one or more algorithms. The model represents the rules, numbers, and any other algorithm-specific data structures required to make predictions for the drilling parameters required to achieve the multiple objectives while drilling a section of a well.

Once the plurality of predictive models 206 has been created and validated for the plurality of depth intervals, formation types, or formation depth intervals, a plurality of model outcomes are determined for each predictive model of the plurality that allow to achieve the multiple objectives. An optimization process 208 is performed on the plurality of outcomes to determine the outcome that optimally satisfies the multiple objectives 202. Each outcome of the plurality of outcomes includes at least one value for one or more drilling parameters. The value can also include a maximum value or a minimum value. A single objective problem can provide a single outcome, representing an optimal solution for the one or more drilling parameters to achieve the single objective. A multiple objective problem includes a trade-off between competing objectives. A plurality of outcomes of a multi objective problem can provide valid solutions, wherein each of the plurality of outcomes comprises a value for the one or more drilling parameters. The value(s) lead to achievement of the multiple objectives. The outcomes comprise a set of values for a set of drilling parameters. The plurality of outcomes form a Pareto front of outcomes 210. A selected outcome from the Pareto front has an associated optimal solution of the one or more drilling parameters 212 for the multiple objectives. For a Pareto front, a value for a drilling parameter in the optimal solution cannot be altered without deviating from an optimal value of at least one of objectives.

Figure 3:
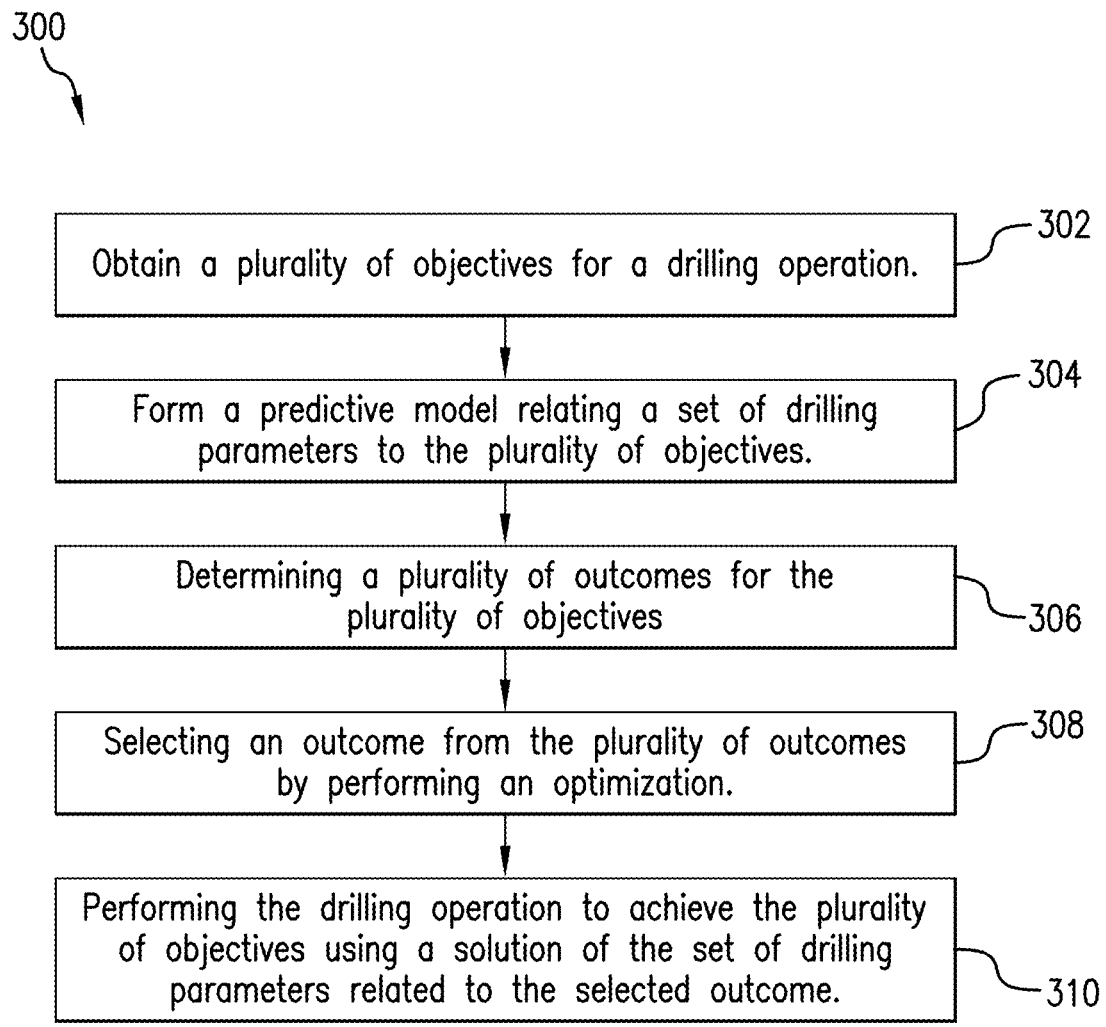
FIG. 3 shows a flowchart of a method for performing a drilling operation.

FIG. 3 shows a flowchart 300 of a method for performing a drilling operation. In box 302, a plurality of objectives is obtained for the drilling operation. In box 304, a predictive model is created for a depth interval of the wellbore to form a relation between drilling parameters of the drilling system 100 and the obtained plurality of objectives. In box 306, the predictive model is used to determine a set of outcomes for the plurality of objectives. The set of outcomes can be a Pareto front of outcomes, in various embodiments. In box 308, an outcome is selected from the set of outcomes by performing an optimization to provide an optimal solution of the one or more drilling parameters to achieve the plurality of objectives. In general, a criterion is applied to the set of outcomes or an operator can review the set of outcomes in order to select the outcome from the Pareto front. Alternatively, the outcome is selected by a mathematical algorithm such as a particle swarm optimization. The process is repeated for each depth interval, for each formation type or formation depth interval. In box 310, the values of the drilling parameters associated with the selected outcome are used to perform the drilling operation to achieve the plurality of objectives.

Figure 4:
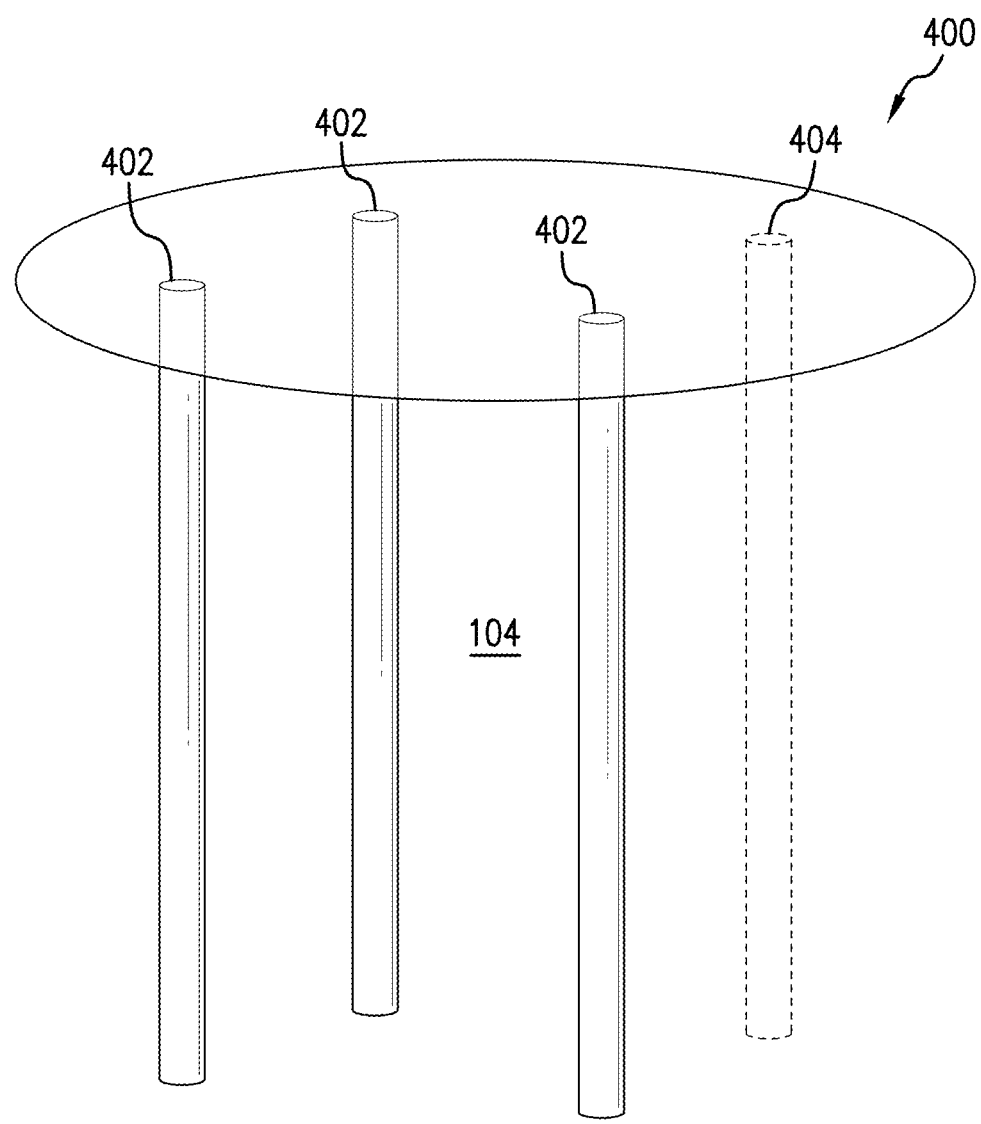
FIG. 4 shows a drilling field including one or more historical wells and a target well.

FIG. 4 shows a drilling field 400 including one or more historical wells 402 (i.e., wells that have already been drilled) and a target well 404 (i.e., a well that is yet to be drilled). The historical wells 402 and the target well 404 have in common that they are formed in a same or similar sequence or combination of downhole formation types 104. As discussed with respect to FIG. 1, performing a drilling operation in any of the historical wells 402 generates historical data. The historical data include drilling parameters (e.g., WOB, RPM, flow rate, mud density, etc.) and data representing objectives (e.g., ROP, vibration levels, torque, bending, well path quality). This historical data can be obtained "off-line" or before drilling of the target well 404 and stored for later use in determining various drilling parameters for the target well 404, using the methods disclosed herein. In various embodiments, the historical data can be stored in the memory storage device 144 of the control unit 140 of FIG. 1.

Figure 5:
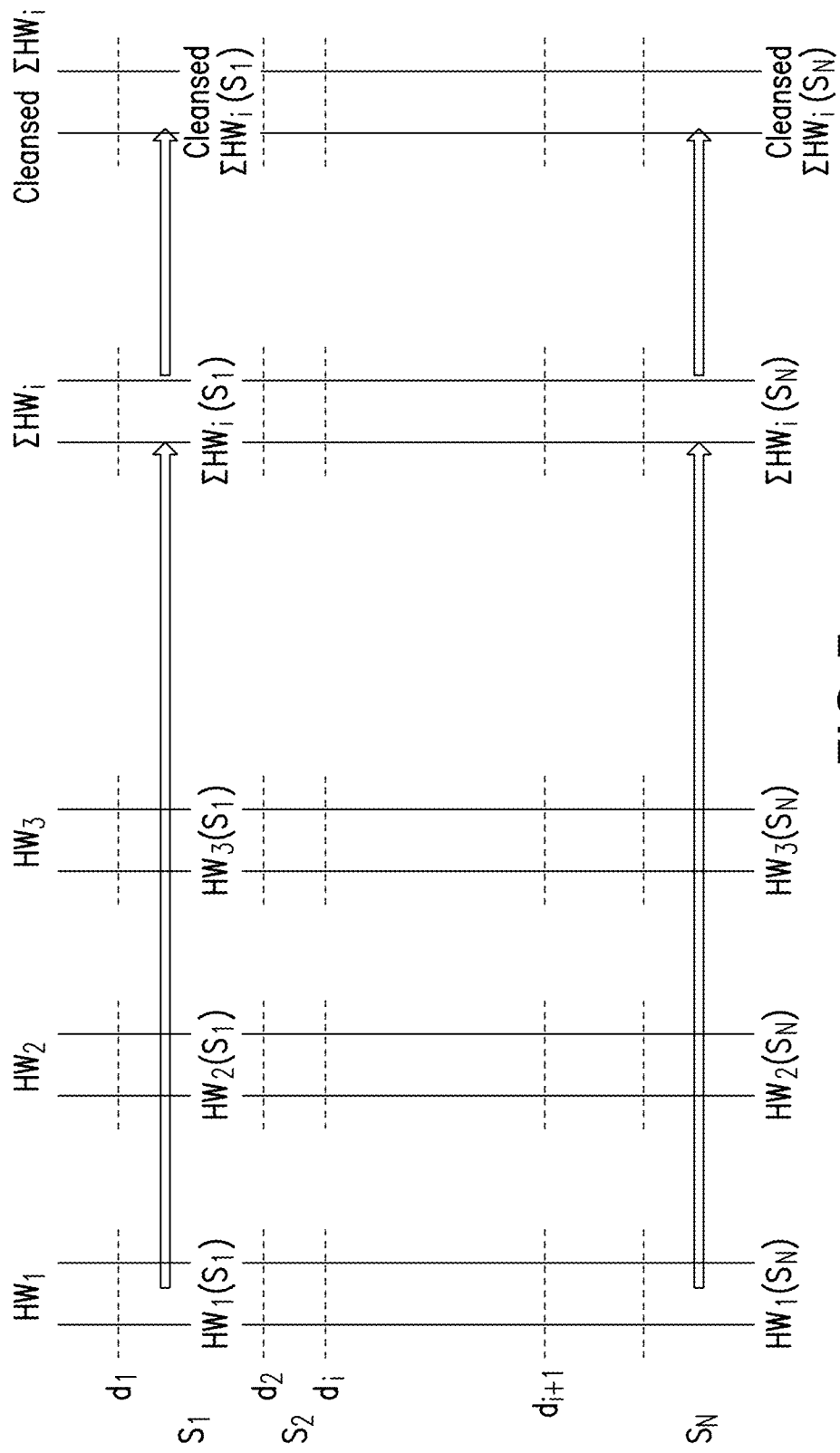
FIG. 5 shows a schematic diagram illustrating a method of obtaining and preparing the historical data.

FIG. 5 shows a schematic diagram 500 illustrating a method of obtaining and preparing the historical data. Three historical data sets (HW1, HW2 and HW3) obtained from respective wells are shown. The historical data sets include historical drilling parameters (i.e., the values of the drilling parameters used to drilling the historical wells) and historical objective values (i.e., values that were achieved for the objectives by using the values of the drilling parameters) obtained along a length of the corresponding historical wells. These historical data sets are combined to form a compiled data set ($\Sigma HWi$) for an $i^{th}$ well. The compiled data set can be cleansed using various methods disclosed herein.

In one embodiment, the historical well data sets (HW1, HW2 and HW3) can be segmented into depth intervals or formation types (lithology) or formation depth intervals. For example, historical well data sets (HW1, HW2 and HW3) are shown to be segmented into N intervals representing N depth intervals, N formation types, or N formation depth intervals (S1, . . . , SN). Each interval is defined by a starting depth and an end depth or a formation type, which can be based on variations with depth of formation properties, such as shale content, porosity, density, permeability, etc. The end depth for one interval is the same as the starting depth for the next lower interval. For example, interval S1 is defined by starting depth d1 and end depth d2, and d2 is also the starting depth for interval S2. In embodiments, a gap may exist between neighboring depth intervals or formation type intervals S1 and S2. In this case, the end depth d2 of interval S1 can differ from the starting depth of interval S2.

Each interval (e.g., interval S1) includes data sets (HW1(S1), HW2(S1) and HW3(S1)) from each of the historical wells (HW1, HW2, HW3). Within a selected interval, the data sets (HW1(S1), HW2(S1) and HW3(S1)) can be combined to form a compiled dataset ($\Sigma HWi(S1)$) for the interval (e.g., interval S1). In various embodiments, computer simulation data can include statistical and/or physics-based models and can be used to fill in gaps in the historical data sets. For example, at an interval at which there is no or little historical data, computer simulation data can be combined with the historical data sets to form a complete data set.

Figure 6:
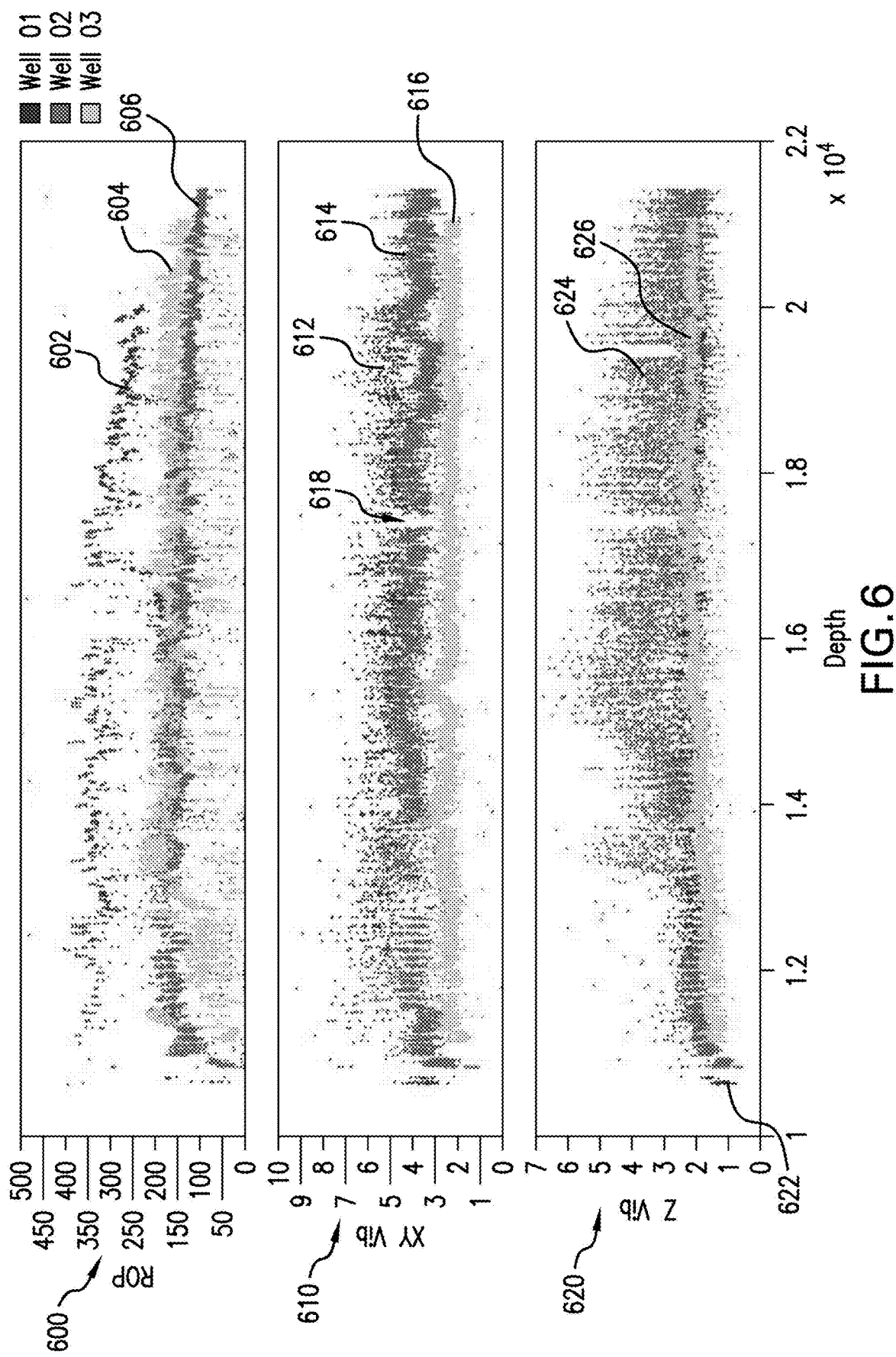
FIG. 6 shows rate of penetration data and vibration data obtained from historical wells in one embodiment.

FIG. 6 shows vibration data obtained from historical wells in one embodiment. The vibration data is historical performance data (e.g., dynamic data from a dynamic sensor). A first graph 600 shows ROP data from a first well 602, second well 604 and third well 606. Depth is shown along the abscissa in 10^4 feet, and ROP is shown along the ordinate axis in multiples of ft/h. A second graph 610 shows transverse drill string vibration (XY Vib) from a first well 612, second well 614 and third well 616. Depth is shown along the abscissa in 10^4 feet, and XY Vib is shown along the ordinate axis in multiples of g (acceleration of gravity at the surface of the earth, approximately 9.8 meters/second^2). A third graph 620 shows axial drill string vibration (Z Vib) from a first well 622, second well 624 and third well 626. Depth is shown along the abscissa in 10^4 feet, and Z Vib is shown along the ordinate axis in multiples of g.

Separately, the data from a well can have a gap (e.g., gap 618 in XY Vib data for second well 614) at a given depth or type of formation and therefore may not provide useful information for a section at the given depth. However, by combining data from multiple wells, data can be provided along an entire depth or substantially an entire depth of the well.

The compiled dataset can be cleansed, and outlier analysis can be performed on the combined data set to remove or modify outlier data points. A warning can be issued if more than a selected percentage of the data set is removed or discarded due to the outlier analysis. For various embodiments, the selected percentage is >30%, >20%, >15%, or >10%. A predictive model can then be defined over the selected interval based on the subset of historical data for the interval, as discussed with respect to FIG. 7.

Under certain circumstances it may be desired to consider the rate of penetration as a drilling parameter, instead of an objective. Historical ROP data may then be used to build the predictive model. An objective may be to keep the level of vibration below a certain limit and/or to keep the wear rate of the drill bit below a certain wear rate. The predictive model then provides as an outcome the ROP, among other drilling parameters, that is to be used in a well to be drilled to achieve the objectives. Similarly, the torque may be used as a drilling parameter instead of an objective.

Figure 7:
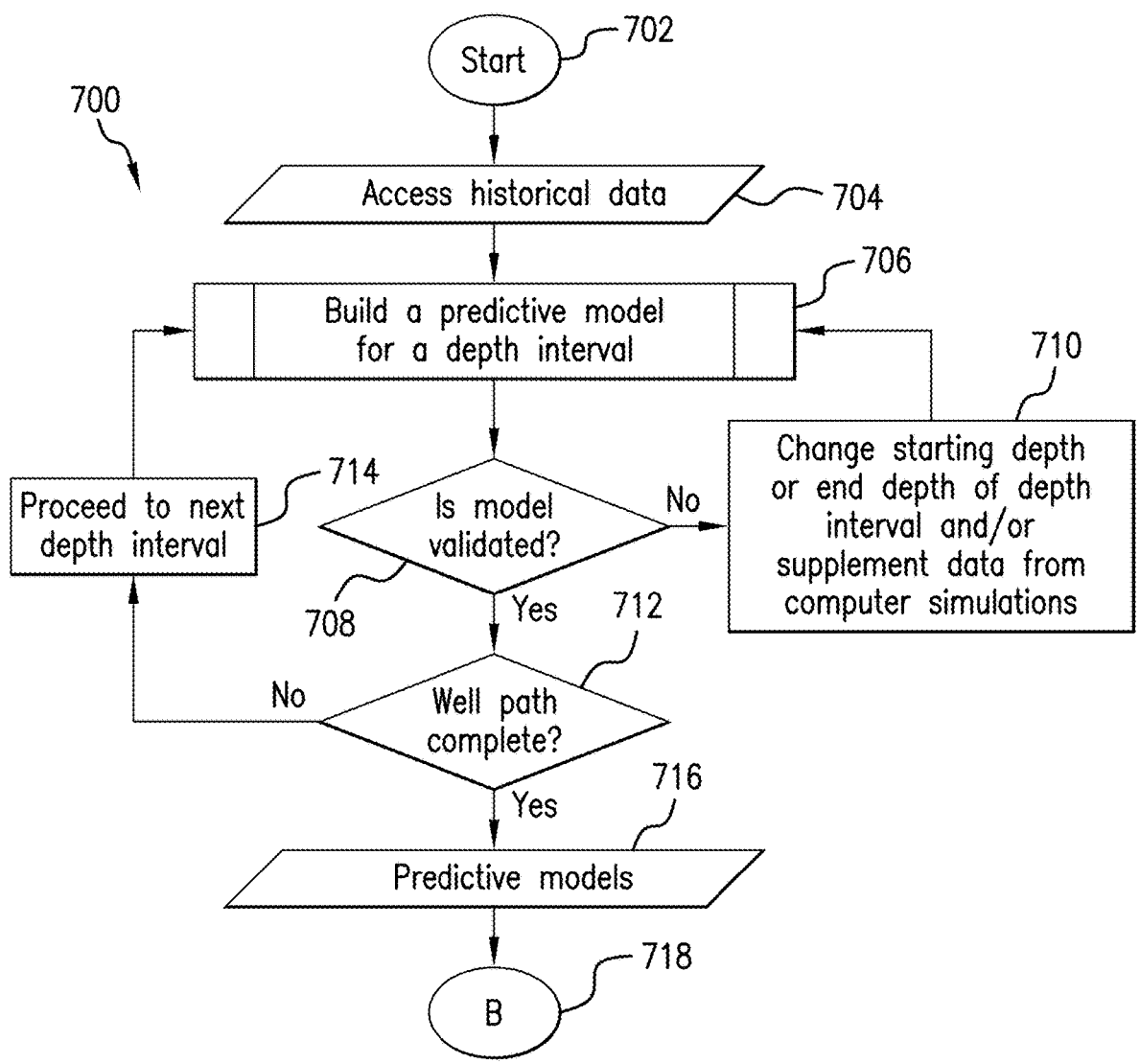
FIG. 7 shows a flowchart illustrating a method of creating a set of predictive models associating drilling parameters with a plurality of objectives in a drilling operation.

FIG. 7 shows a flowchart 700 illustrating a method of creating a set of predictive models associating drilling parameters with a plurality of objectives in a drilling operation. The method illustrated by the flowchart 700 can be performed offline or prior to drilling of the target well, as well as during the drilling operation (e.g., in real time). The method starts at box 702. In box 704, the historical data is accessed. In box 706, a predictive model is built for a selected depth interval (e.g., the first depth interval S1), including a starting depth and an end depth. The historical data for the selected depth interval is considered. The predictive model for the selected depth interval is created by separating the historical data into two sets of data: a training set and a validation set. In one embodiment, the training data set includes 75% of the combined data set and the validation data set includes the remaining 25% of the combined data set. The training set is used to build the predictive model. In one embodiment, a machine learning program, such as a neural network, receives the training data as input and generates the predictive model based on the training data. In embodiments the separation of the historical data into two sets may be 60% training data and 40% test data, 80% training data and 20% test data, or 90% training data and 10% test data. While creating the predictive models, assumptions are made, such as the BHA configuration stays the same or similar in the target well as in the historical well(s), the drill bit stays the same or similar in the target well as in the historical well(s), the depth intervals are wellbore corrected among the historical well(s) and the target well with respect to formation type (depth intervals correlate), and the target well is localized in a similar formation as the historical wells.

In box 708, the method performs a validation test on the predictive model using the training data to determine whether the model is valid over the depth interval to provide a validated predictive model. If it is determined that a predictive model is not valid, the method proceeds to box 710 in which a length of the depth interval is increased or adjusted by raising or lowering the starting depth or the end depth of the depth interval or augmenting the data from computer simulations/physics models/field-physics models. The machine learning program can adjust the depth interval. Increasing the length adds more data that can be used to create the predictive model. From box 708, the method returns to box 706 in order to form another predictive model based on the new length of the depth interval. Returning to box 708, if it is determined that the predictive model is valid, the method proceeds to box 712. Alternatively, at box 708, if it is not possible to raise or lower the starting depth or end depth, the method can proceed to box 712 with the best possible predictive model for the depth interval. At box 712, a test is made to determine if the well path is completed, i.e., if a predictive model has been created for all the depth intervals of the well path. If the well path is not complete, then the method proceeds to box 714 in which an interval counter is increased, thereby moving the method to the next depth interval (or formation type). The method then proceeds to box 706 to form the predictive model for the next depth interval. Returning to box 712, if the well path is complete, the method proceeds, at box 716 to assemble the predictive models for the entire well (i.e., for all depth intervals or all formation types) and then ends at box 718. The predictive models built in process 700 can be distinct for each depth interval.

Any number of predictive models can be used, in various embodiments. Examples of approaches to building a predictive model include least squares modeling, regression modelling, support vector machine modeling, neural network modeling, random forest modeling and Bayes modeling. The predictive models can be modified as appropriate, depending upon the amount and applicability of the historical data. A predictive model can be used with real-time data to develop real-time drilling optimization while drilling a well.

Figure 8:
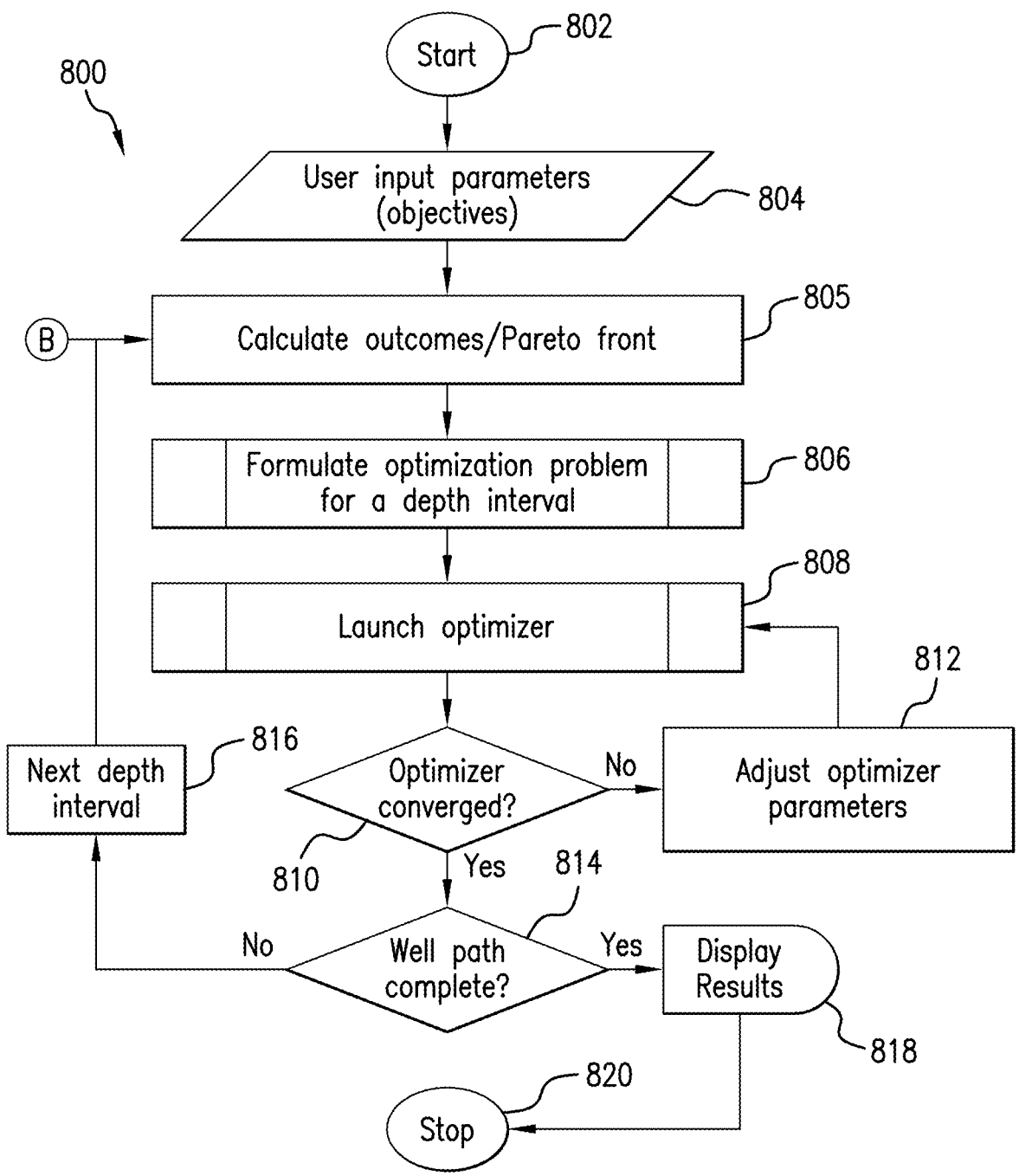
FIG. 8 shows a flowchart illustrating a method of determining a Pareto front of outcomes for a plurality of objectives and applying an optimization to identify optimized drilling parameters.

FIG. 8 shows a flowchart 800 illustrating a method of determining a Pareto front of outcomes for a plurality of objectives. The method starts at box 802. In box 804, a user, operator or a processor specifies a plurality of target objectives (multiple target objectives) for a drilling operation. In box 805 the predictive model built and validated in flow chart 700 is used to determine a plurality of outcomes (e.g., Pareto front) based on the specified plurality of target objectives. In box 806, an optimization problem for the specified plurality of target objective is formulated over a selected depth interval of the well. In box 808, an optimization process is performed to select an outcome from the plurality of outcomes (select an outcome from the Pareto front) in order to determine an optimal solution of the predictive model for the plurality target objectives. The optimal solution is a set of values for the drilling parameters (i.e., target drilling parameters) required while drilling the well (e.g., the fourth well in FIG. 4) to achieve the specified plurality of target objectives.

In box 810, a test is performed to determine whether the optimization process of 808 has converged. If the optimization process has not converged, the method proceeds to box 812. In box 812, parameters of the optimizer are adjusted. The method then proceeds back to box 808 to repeat the optimization process. The optimization algorithm of boxes 808, 810 and 812 is continued until the process converges to an optimal solution.

Returning to box 810, once the optimization process has converged to an optimal solution, the method proceeds to box 814 to check whether the optimization has been performed over each depth interval and for each predictive model. If the optimization process has not been performed over all depth intervals of the well path, the method proceeds to box 816 in which an interval counter is increased in order to move the method to the next depth interval (e.g., lower or upper depth interval, or any other order). The method then proceeds to box 805 to determine a plurality of outcomes (e.g., Pareto front) based on the specified plurality of target objectives for the next depth interval. Returning to box 814, if optimization has occurred over the entire well path (all depth intervals), the method displays the results at box 818 and ends at box 820. The results are at least one optimal solution for each of the depth intervals. Beside or instead of displaying the optimal solution for each depth interval, a processor may apply the optimal solution in a drilling operation in a fully automated drilling process without the intervention of a human operator. The disclosed method may be coordinated and controlled by artificial intelligence (AI) either offline or real-time while drilling a well. The AI interacts with algorithms such as the algorithm to prepare the historical data (data cleansing), the algorithm to build the predictive model, the algorithm to validate the model, the optimization algorithm, and the performing of the drilling operation. AI can create or write necessary files, plots and error messages.

Figure 9:
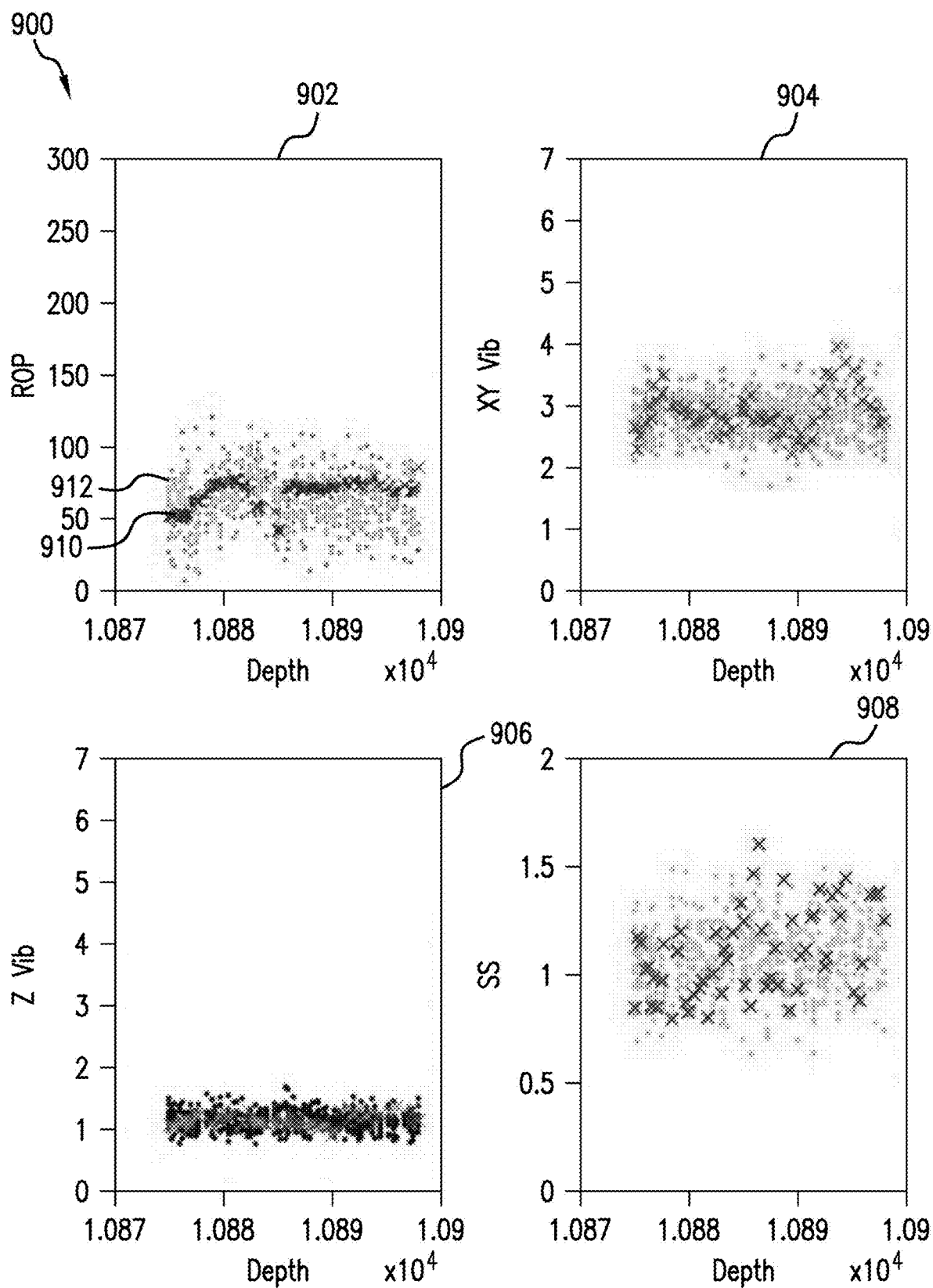
FIG. 9 shows results of a validation process for a set of predictive models.

FIG. 9 shows results of a validation process (such as from box 708 of FIG. 7) for a set of predictive models. Graphs are shown for ROP 902, XY vibration 904, Z vibration 906 in multiples of g and stick-slip vibration 908 in units of a stick-slip indicator. Observing the graph for ROP 902, a set of actual data 910 a set of predicted data 912 are shown. A difference or error between actual and predicted values is calculated. If the difference/error is within a selected bound, the model is considered validated. In one embodiment, the selected error is 5%. In another embodiment the selected error is 3%. In yet another embodiment the selected error is 7%. The number of predicted values for each actual value can be one or more. Since the actual data lies within the predicted data 912, there is good agreement from the predictive models, and the predictive models can be considered validated.

An illustrative optimization algorithm is now discussed. A generic mathematical formulation of a multi-objective optimization problem is shown in Eqs. (1)-(4):

$$\min f_l(X) \text{ or } \max f_l(X) \; l=1,2,\ldots,L \quad \text{Eq. (1)}$$

subject to constraints $$g_j(X) \geq 0 \; j = 1, 2, \ldots, J \quad \text{Eq. (2)}$$

$$h_k(X) = 0 \; k = 1, 2, \ldots, K \quad \text{Eq. (3)}$$

with variable bounds $$X_i^{Lower} \leq X_i \leq X_i^{Upper} \; i = 1, \ldots, N \quad \text{Eq. (4)}$$

where $f_l(X)$ is the optimization objective (e.g., maximize ROP), $g_j(X)$ represents inequality constraints, and $h_k(X)$ represents equality constraints, and L, J, K and N represent the number of objectives, inequality constraints, equality constraints and parameters, respectively. The variable X or $X_i$ represents drilling parameters, (e.g., WOB, flow rate, RPM of the drill string, mud density, etc.).

An example of a mathematical formulation of a multi-objective drilling optimization problem for an $m^{th}$ section of a well is shown below in Eqs. (5)-(8):

$$\text{Constraints} \begin{cases} \mu_{lateral}^m(X) < U_{lateral}^m & \text{Eq. (7)} \\ \mu_{axial}^m(X) < U_{axial}^m \\ \mu_{tangential}^m(X) < U_{tangential}^m \\ \mu_{stick-slip}^m(X) < U_{stick-slip}^m \end{cases}$$

with variable bounds $$X_i^{Lower} \leq X_i \leq X_i^{Upper} \quad \text{Eq. (8)}$$

where the index m represents the depth interval number with m={1, 2, 3, M}. The value $T_m(X)$ is a target objective (e.g., drilling optimization performance target) for the $m^{th}$ depth interval. $ROP_m(X)$ is the rate of penetration for the $m^{th}$ depth interval (units=m/h or ft/h).

$$\mu_{lateral}^m(X)$$

is the average lateral vibration in the $m^{th}$ depth interval, $$\mu_{axial}^m(X)$$

is the average axial vibration in the $m^{th}$ depth interval, $$\mu_{tangential}^m(X)$$

is the average tangential vibration in the $m^{th}$ depth interval and $$\mu_{stick-slip}^m(X)$$

is the average stick-slip in the $m^{th}$ depth interval.

$$U_{lateral}^m$$

is the maximum desired lateral vibration in the $m^{th}$ depth interval, $$U_{axial}^m$$

is the maximum desired axial vibration in the $m^{th}$ depth interval, $$U_{tangential}^m$$

is the maximum desired tangential vibration in the $m^{th}$ depth interval, and $$U_{stick-slip}^m$$

is the maximum desired stick-slip in the $m^{th}$ depth interval.

An example of a mathematical formulation of a multi-objective drilling optimization problem for an $m^{th}$ section is shown by Eqs. (9)-(11) below.

$$\text{Objectives:} \begin{cases} \text{Maximize } ROPm(X) \\ \text{Minimize } MSEm(X) \end{cases} \quad \text{Eq. (9)}$$

$$\text{constraints} \begin{cases} \mu_{lateral}^m(X) < U_{lateral}^m(X) \\ \mu_{axial}^m(X) < U_{axial}^m(X) \\ \mu_{stickslip}^m(X) < U_{stickslip}^m(X) \end{cases} \quad \text{Eq. (10)}$$

$$\text{Variable Bounds: } X_i^{Lower} < X_i < X_i^{Upper} \quad \text{Eq. (11)}$$

A solution of the optimization problem outlined in Eqs. (9)-(11) locates suitable target drilling parameters (target outcomes or optimal solution) that achieve the target objectives of drilling at a target ROP and a target MSE without exceeding XY vibration, Z vibration and stick-slip limit. Various optimization algorithms can be used to solve this problem. In general, multiple optimization problems are solved for each wellbore (one optimization problem per depth interval of the well). In one embodiment, an evolutionary algorithm, such as a Particle Swarm Optimization algorithm is used to optimize the drilling parameters.

Particle Swarm Optimization modifies a set of potential solutions from iteration-by-iteration based on a set of communication rules. Each potential solution is referred to as a particle, with the particles collectively referred to as a population. The movement of a particle is based on a current fitness of the particle, a best fitness of the particle, a best fitness of all particles of the population and a communication structure between particles. An illustrative communication structure is given below by Eqs. (12) and (13):

$$v_j^{k+1} = wv_j^k + q_1 r_{j1}(pbest_j - s_j^k) + q_2 r_{j2}(gbest - s_j^k) \quad \text{Eq. (12)}$$

$$s_j^{k+1} = s_j^k + v_j^{k+1} \quad \text{Eq. (13)}$$

Equation (12) is used to decide how much a particle is going to move in a multi-dimensional space. Equation (13) calculates the particle's position for the next iteration.

$$v_j^k$$

is a velocity of the $j^{th}$ particle for the $k^{th}$ iteration, $$s_j^k$$

is a position of the $j^{th}$ particle for the $k^{th}$ iteration, w is an inertia weight, $q_1$ is a cognitive constant and $q_2$ is a social constant. Illustrative values of the inertia weight, cognitive constant and social constant are $w=0.5$, $q_1=1.5$ and $q_2=1.5$. Also in Eqs. (12) and (13), $r_{j1}$ and $r_{j2}$ are first and second random numbers of the $j^{th}$ particle and are within a range of [0,1]. $pbest_j$ is a personal best position of the $j^{th}$ particle, and gbest is a global best fitness of particles up to a current iteration. A maximum velocity of the particles is constrained by $f(X^{UPPer}, X^{Lower})$ and a minimum velocity of the particles is constrained by $-f(X^{Upper}, X^{Lower})$. The term $erp_h$ refers to an $h^{th}$ elitist repository particle. This particle is selected from an elitist repository. The erph is determined by dividing the known search space into hypercubes. A fitness value of the particles in a hypercube containing more than one particle is divided by a number greater than 1 to decrease the fitness of the hypercube. A particle is randomly selected from this hypercube, and velocity calculation is performed on the selected particle. A pressure subsequently generated on particles of the hypercube move particle from a crowded hypercube to a less crowded hypercube. A new position of the particles is calculated after the velocity has been calculated. The parameters in Eq. (12) and Eq. (13) are also referred to as optimizer parameters.

Figure 10:
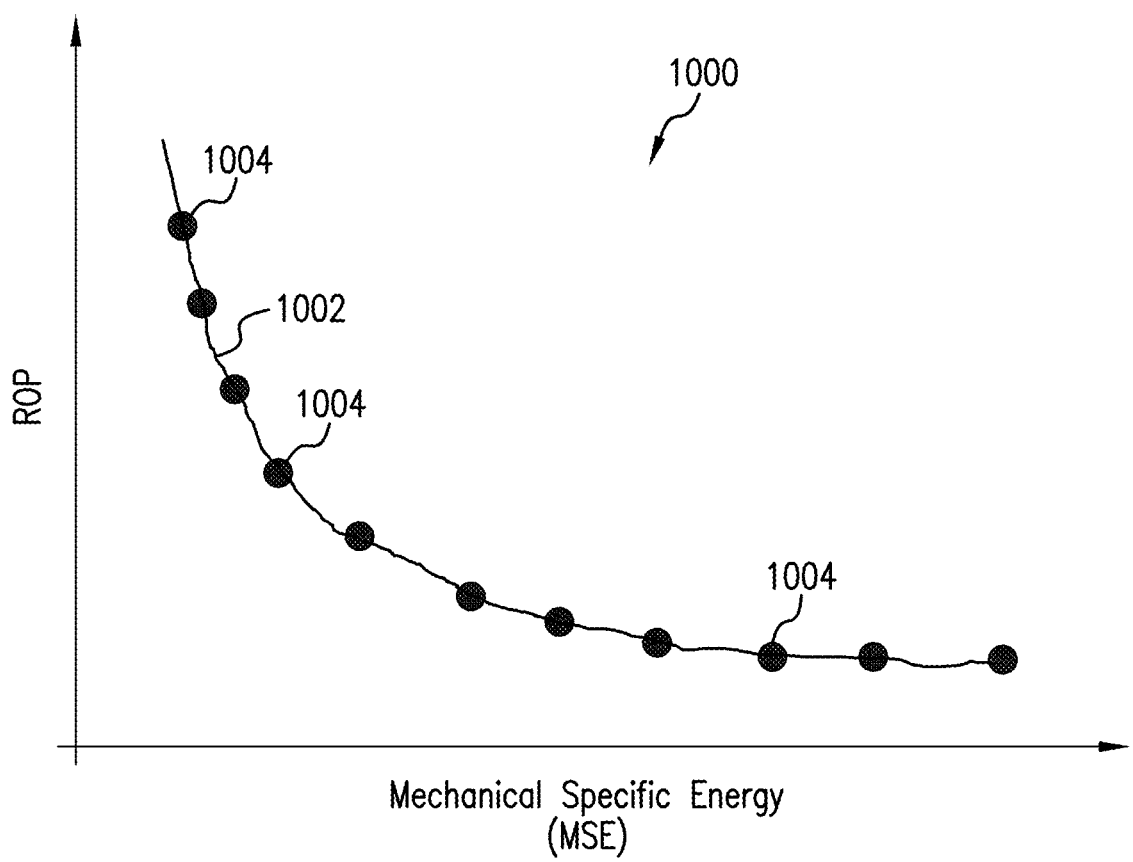
FIG. 10 shows a Pareto front of outcomes for a multi-objective optimization.

FIG. 10 shows an illustrative graph 100 relating two different objectives in a multi-objective optimization. Graph 1000 shows a relation between an objective of Mechanical Specific Energy (MSE) and an objective of rate of penetration (ROP), with MSE shown along the x-axis and ROP shown along the y-axis. A lower value of MSE indicates a higher drilling efficiency. A lower value of MSE also results in lower vibration levels and less damage to the tool. A higher value of ROP indicates a high technological effectiveness. MSE and ROP therefore represent two conflicting objectives. Curve 1002 represents a plurality of outcomes, also known as a Pareto front of solutions. Dots 1004 on curve 1002 are selected non-dominated outcomes. Each layer (depth interval) in a formation can have different Pareto fronts based on the formation properties and the tool condition (e.g., bit wear). Graph 1000 shows a generic formation in which ROP and MSE are inversely related to each other.

Figure 11:
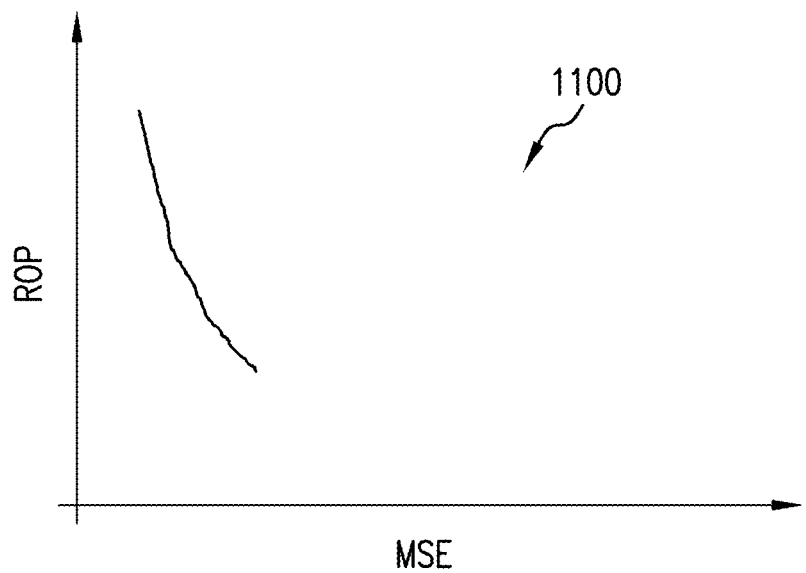
FIG. 11 shows a graph relating two different objectives representative of drilling in a hard formation.
Figure 12:
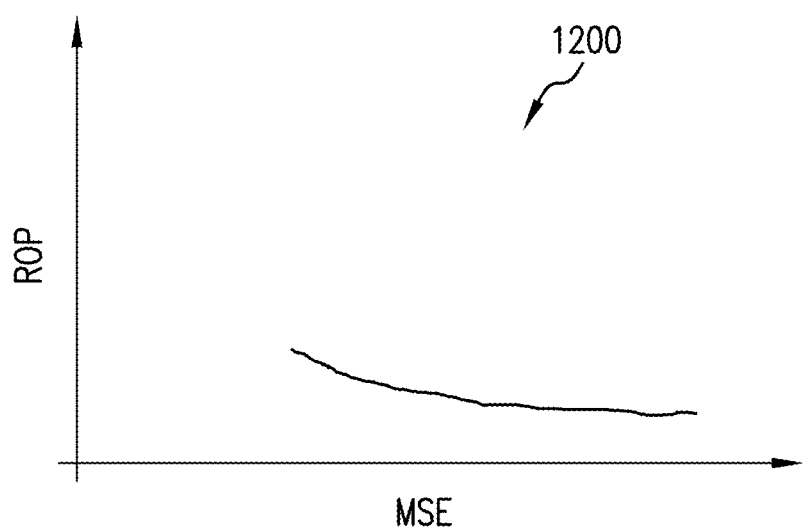
FIG. 12 shows a graph relating two different objectives representative of drilling in a soft formation.

FIG. 11 shows a graph 1100 representative of drilling in a hard formation. In hard formations, it is difficult to achieve higher ROP without having a lower MSE. FIG. 12 shows a graph 1200 representative of drilling in a soft formation. In soft formations, it is possible to achieve higher ROP and lower MSE.

Set forth below are some embodiments of the foregoing disclosure:

Embodiment 1: A method of performing a drilling operation in a downhole formation. The method includes determining a plurality of predictive models, each predictive model of the plurality of predictive models being determined for an interval in the downhole formation, wherein each predictive model of the plurality of predictive models relates one or more drilling parameters of the drilling operation to a plurality of objectives for the drilling operation, defining a plurality of target objectives, determining a plurality of outcomes for each of the predictive models of the plurality of predictive models and the plurality of target objectives, performing an optimization to select an outcome from the plurality of outcomes, and performing the drilling operation using the selected outcome to achieve the plurality of target objectives.

Embodiment 2: A method of any prior embodiment, wherein each of the outcomes includes one or more target drilling parameters that achieve the plurality of target objectives.

Embodiment 3: A method of any prior embodiment, further comprising determining at least one of the predictive models of the plurality of predictive models based on at least one of: (i) historical data from a previously drilled well; and (ii) a computer simulation.

Embodiment 4: A method of any prior embodiment, wherein the interval is one of a depth interval and a formation type interval, the method further including segmenting the historical data from the previous drilled well into one of a plurality of depth intervals and a plurality of formation types.

Embodiment 5: A method of any prior embodiment, wherein determining each predictive model of the plurality of predictive models for a depth interval of the plurality of depth intervals further comprises adjusting one of a start depth or an end depth of the depth interval.

Embodiment 6: A method of any prior embodiment, further comprising adjusting the segmenting of the historical data from the previous drilled well based on a formation parameter.

Embodiment 7: A method of any prior embodiment, wherein the plurality of objectives includes at least one of a rate of penetration, a vibration level, a mechanical specific energy, a hole cleaning efficiency, and a wear rate.

Embodiment 8: A method of any prior embodiment, wherein the one or more drilling parameters include at least one parameter selected from: revolutions per minute (RPM), a flow rate of a fluid, a weight-on-bit (WOB), and a mud density.

Embodiment 9: A method of any prior embodiment, wherein the one or more drilling parameters include at least one parameter selected from: rate of penetration and torque.

Embodiment 10: A method of any prior embodiment, further comprising operating a machine learning program to determining the plurality of predictive models.

Embodiment 11: A method of any prior embodiment, wherein performing the optimization includes using a particle swarm optimization.

Embodiment 12: A method of any prior embodiment, wherein performing the optimization includes adjusting at least on optimizer parameter of the particle swarm optimization.

Embodiment 13: A method of any prior embodiment, wherein the plurality of outcomes forms a Pareto front.

Embodiment 14: A method of any prior embodiment, wherein at least one of the predictive models of the plurality of predictive models is a statistical model.

Embodiment 15: A method of any prior embodiment, further comprising validating at least one of the predictive models of the plurality of predictive models.

Embodiment 16: A computer-readable medium having a set of instructions thereon that when accessed by a processor, enable the processor to execute a method of performing a drilling operation in a downhole formation, the method including: determining plurality of predictive models, each predictive model of the plurality of predictive models being determined for an interval in the downhole formation, wherein each predictive model of the plurality of predictive models relates one or more drilling parameters of the drilling operation to a plurality of objectives for the drilling operation, defining a plurality of target objectives, determining a plurality of outcomes for each of the predictive models of the plurality of predictive models and the plurality of target objectives, performing an optimization to select an outcome from the plurality of outcomes, and performing the drilling operation using the selected outcome to achieve the plurality of target objectives.

Embodiment 17: The computer-readable medium of any prior embodiment, further comprising determining at least one of the predictive models of the plurality of predictive models based on at least one of: (i) historical data from a previously drilled well; and (ii) a computer simulation, wherein the interval is one of a depth interval and a formation type interval, and segmenting the historical data from the previous drilled well into one of a plurality of depth intervals and a plurality of formation types.

Embodiment 18: The computer-readable medium of any prior embodiment, wherein the plurality of objectives includes at least one of a rate of penetration, a vibration level, a mechanical specific energy, a hole cleaning efficiency, and a bit wear rate.

Embodiment 19: The computer-readable medium of any prior embodiment, wherein the one or more drilling parameters include at least one parameter selected from: revolutions per minute (RPM), a flow rate of a fluid, a weight-on-bit (WOB), and a mud density.

Embodiment 20: The computer-readable medium of any prior embodiment, wherein performing the optimization includes using a particle swarm optimization.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of performing a drilling operation in a downhole formation, comprising:
    determining a plurality of predictive models, each predictive model of the plurality of predictive models being determined for an interval in the downhole formation, wherein each predictive model of the plurality of predictive models relates one or more drilling parameters of the drilling operation to a plurality of objectives for the drilling operation, and wherein determining a predictive model includes:
    selecting data from within the interval,
    training the predictive model using the data,
    checking the trained predictive model for validity, and
    adjusting a length of the interval when the trained predictive model is not valid;
    defining a plurality of target objectives;
    determining a plurality of outcomes for each of the predictive models of the plurality of predictive models and the plurality of target objectives;
    performing an optimization to select an outcome from the plurality of outcomes, wherein the selected outcome includes a value of a drilling parameter; and
    controlling the drilling system by using the drilling parameter to achieve the plurality of target objectives.

2. The method of claim 1, wherein each of the plurality of outcomes includes one or more target drilling parameters that achieve the plurality of target objectives.

3. The method of claim 1, further comprising determining at least one of the predictive models of the plurality of predictive models based on at least one of: (i) historical data from a previously drilled well; and (ii) a computer simulation.

4. The method of claim 3, wherein the interval is one of a depth interval and a formation type interval, and the method further comprising segmenting the historical data from the previous drilled well into one of a plurality of depth intervals when the interval is a depth interval and a plurality of formation types when the interval is a formation type interval.

5. The method of claim 4, wherein the interval is the depth interval, and wherein determining each predictive model of the plurality of predictive models for the depth interval of the plurality of depth intervals further comprises adjusting one of a start depth or an end depth of the depth interval.

6. The method of claim 4, further comprising adjusting the segmenting of the historical data from the previous drilled well based on a formation parameter.

7. The method of claim 1, wherein the plurality of objectives includes at least one of a rate of penetration, a vibration level, a mechanical specific energy, a hole cleaning efficiency, and a wear rate.

8. The method of claim 1, wherein the one or more drilling parameters include at least one parameter selected from: revolutions per minute (RPM), a flow rate of a fluid, a weight-on-bit (WOB), and a mud density.

9. The method of claim 1, wherein the one or more drilling parameters include at least one parameter selected from: rate of penetration and torque.

10. The method of claim 1, further comprising operating a machine learning program to determining the plurality of predictive models.

11. The method of claim 1, wherein performing the optimization includes using a particle swarm optimization.

12. The method of claim 11, wherein performing the optimization includes adjusting at least one optimizer parameter of the particle swarm optimization.

13. The method of claim 1, wherein the plurality of outcomes forms a Pareto front.

14. The method of claim 1, wherein at least one of the predictive models of the plurality of predictive models is a statistical model.

15. The method of claim 1, further comprising validating at least one of the predictive models of the plurality of predictive models.

16. A non-transitory computer-readable medium having a set of instructions thereon that when accessed by a processor, enable the processor to execute a method of performing a drilling operation in a downhole formation, the method comprising:
    determining plurality of predictive models, each predictive model of the plurality of predictive models being determined for an interval in the downhole formation, wherein each predictive model of the plurality of predictive models relates one or more drilling parameters of the drilling operation to a plurality of objectives for the drilling operation, and wherein determining a predictive model includes:
    selecting data from within the interval,
    training the predictive model using the data,
    checking the trained predictive model for validity, and
    adjusting a length of the interval when the trained predictive model is not valid;
    defining a plurality of target objectives;
    determining a plurality of outcomes for each of the predictive models of the plurality of predictive models and the plurality of target objectives;
    performing an optimization to select an outcome from the plurality of outcomes; and
    performing the drilling operation using the selected outcome to achieve the plurality of target objectives.

17. The non-transitory computer-readable medium of claim 16, further comprising determining at least one of the predictive models of the plurality of predictive models based on at least one of: (i) historical data from a previously drilled well; and (ii) a computer simulation, wherein the interval is one of a depth interval and a formation type interval, and segmenting the historical data from the previous drilled well into one of a plurality of depth intervals and a plurality of formation types.

18. The non-transitory computer-readable medium of claim 16, wherein the plurality of objectives includes at least one of a rate of penetration, a vibration level, a mechanical specific energy, a hole cleaning efficiency, and a bit wear rate.

19. The non-transitory computer-readable medium of claim 16, wherein the one or more drilling parameters include at least one parameter selected from: revolutions per minute (RPM), a flow rate of a fluid, a weight-on-bit (WOB), and a mud density.

20. The non-transitory computer-readable medium of claim 16, wherein performing the optimization includes using a particle swarm optimization.

* * * * *